United States Patent
Komatsuki et al.

(10) Patent No.: US 9,099,754 B2
(45) Date of Patent: Aug. 4, 2015

(54) SEALED TYPE CELL MANUFACTURING METHOD

(75) Inventors: Masato Komatsuki, Gifu-ken (JP); Takashi Nakazawa, Toyota (JP); Kaoru Yugahara, Toyota (JP); Hiroya Kondou, Toyohashi (JP); Takato Fujiki, Suzuka (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 1136 days.

(21) Appl. No.: 12/865,480

(22) PCT Filed: Dec. 26, 2008

(86) PCT No.: PCT/JP2008/073750
§ 371 (c)(1),
(2), (4) Date: Oct. 25, 2010

(87) PCT Pub. No.: WO2009/096135
PCT Pub. Date: Aug. 6, 2009

(65) Prior Publication Data
US 2011/0027645 A1   Feb. 3, 2011

(30) Foreign Application Priority Data

Jan. 31, 2008  (JP) ................................. 2008-021791

(51) Int. Cl.
*H01M 2/36* (2006.01)
*H01M 10/44* (2006.01)
(Continued)

(52) U.S. Cl.
CPC ............ *H01M 10/0413* (2013.01); *H01M 2/08* (2013.01); *H01M 2/1241* (2013.01);
(Continued)

(58) Field of Classification Search
CPC ... H01M 2/02–2/0235; H01M 2/0257–2/0275; H01M 2/04–2/0426; H01M 2/0478–2/0495; H01M 2/06–2/065
See application file for complete search history.

(56) References Cited

U.S. PATENT DOCUMENTS 6,174,620 B1 * 1/2001 Okada et al. .................. 429/176
6,232,011 B1 * 5/2001 Azema ............................ 429/61
(Continued)

FOREIGN PATENT DOCUMENTS

JP   2001-338674       12/2001
JP   2004-095543   *   3/2004  ............. H01M 2/06
(Continued)

OTHER PUBLICATIONS

Vreeling et al. (2001). Formation of γ-Al2O3 in Reaction Coatings Produced with Lasers. Scripta Materialia, 44, 4, 643-649.*
(Continued)

*Primary Examiner* — Jonathan Crepeau
*Assistant Examiner* — Jacob Buchanan
(74) *Attorney, Agent, or Firm* — Finnegan, Henderson, Farabow, Garrett & Dunner, LLP

(57) ABSTRACT

A cell assembly (20) is formed by arranging an electrode body and electrolyte in an external case (12) having a through hole (41). A laser is applied to an annular portion (formed by Al or Al-based alloy) surrounding an opening end (41A) of the through hole (41) toward outside the case so as to form a welded base (45). A sealing film (54) is welded to the surface of the welded base directly or via a base film (52) welded in advance, so as to temporarily seal the through hole (41). The cell assembly (20) in the temporarily sealed state is subjected to initial charge and then a hole is opened through the film (54) so as to form a gas discharge passage for communication between inside and outside of the case (12), thereby discharging an excessive gas from the case (12) outside.

15 Claims, 7 Drawing Sheets

(51) Int. Cl.
  *H01M 2/08* (2006.01)
  *H01M 10/04* (2006.01)
  *H01M 2/12* (2006.01)
  *H01M 10/0525* (2010.01)

(52) U.S. Cl.
  CPC .............. *H01M2/361* (2013.01); *H01M 2/365* (2013.01); *H01M 10/0525* (2013.01); *H01M 10/446* (2013.01); *Y02T 10/7011* (2013.01); *Y10T 29/4911* (2015.01)

(56) References Cited

U.S. PATENT DOCUMENTS

| 2001/0034407 | A1* | 10/2001 | Ariyasu et al. | 525/57 |
| 2001/0056008 | A1* | 12/2001 | Bender | 477/121 |
| 2010/0003583 | A1* | 1/2010 | Seong et al. | 429/72 |
| 2012/0058374 | A1* | 3/2012 | Aota et al. | 429/94 |

FOREIGN PATENT DOCUMENTS

| JP | 2004-355977 | 12/2004 | |
| JP | 2005-339946 | 12/2005 | |
| JP | 2007-141774 | 6/2007 | |
| JP | 2007-193969 | 8/2007 | |
| JP | 2007-227310 | 9/2007 | |
| JP | 2007-323882 | * 12/2007 | .............. H01M 2/36 |

OTHER PUBLICATIONS

International Search Report in International Application No. PCT/JP2008/073750 (Apr. 7, 2009).

Rotel, M. et al., "Pre-Bonding technology based on excimer laser surface treatment," Applied Surface Science, 154-155, (2000), pp. 610-616.

Rotel, M. et al., "Laser Induced Reaction for PreBond Surface Preparation of Aluminum Alloys," Israel Institute of Metals, Dec. 1994.

* cited by examiner

SEALED TYPE CELL MANUFACTURING METHOD

TECHNICAL FIELD

The present application is a national phase application of International Application No. PCT/JP2008/073750, filed Dec. 26, 2008, and claims priority right based on Japanese Patent Application 2008-021791, filed Jan. 31, 2008, the entire contents of both of which are hereby incorporated by reference. The present invention relates to a sealed type cell such as a lithium-ion cell.

BACKGROUND ART

Recent years have witnessed a growing importance of sealed type secondary cells such as lithium-ion cells, for instance as vehicle on-board power sources, and as power sources in personal computers, cell phones and the like. Lithium-ion cells, in particular, are lightweight and afford high energy densities, and are thus expected to become preferred high-output on-board power sources.

A typical method for manufacturing a sealed type cell of the above kind involves housing, in a metallic external case, a power-generating element (electrode body) that is provided with a positive electrode, having a positive electrode active material, and a negative electrode, having a negative electrode active material, together with an appropriate electrolyte, followed by (hermetic) sealing of the case. Herein, the cell (cell assembly) immediately after assembly is yet uncharged, and hence initial charging (first-time charging of the built cell, likewise hereafter) is performed on the cell assembly. Some gas (for instance, hydrogen gas) is ordinarily generated in the cell during initial charging, whereupon the internal pressure of the cell rises as a result. Therefore, the gas in the case is let out, after initial charging, by temporarily removing the hermetically sealed state. Such gas relieving (gas discharge) is typically accomplished by way of a through-hole provided in the case, and by forming a gas discharge passage that communicates the interior and the exterior of the case. Once discharge of the gas is over, the gas discharge passage is sealed, whereby the interior of the case is reverted to a hermetically sealed state. Sealed type cells are thus manufactured as described above. Examples of background art documents relating to this technology include, for instance, Patent documents 1 to 4 below.

Patent document 1: Japanese Patent Application Publication No. 2004-355977
Patent document 2: Japanese Patent Application Publication No. 2001-338674
Patent document 3: Japanese Patent Application Publication No. 2007-193969
Patent document 4: Japanese Patent Application Publication No. 2005-339946

DISCLOSURE OF THE INVENTION

In the technology disclosed in Patent document 1 (for instance, paragraph [0089]), temporary sealing is performed by inserting a fluorocarbon synthetic rubber stopper into a liquid-injection hole, so that, after initial charging and ageing, excessive gas is discharged by removing the rubber stopper. The operations of fitting and removing the rubber stopper, however, are hard to automate, and thus productivity is difficult to increase. Moreover, increases in inner pressure may cause the rubber stopper to float (to be pushed out). The pressure-resistance sealability of the temporarily sealed state tends to be insufficient. The sealing performance (in terms of preventing intrusion of moisture or the like) afforded by an elastic member such as rubber is insufficient upon temporary sealing, and thus intrusion of moisture into the temporarily sealed case remains a concern. The same is true of the subject matter disclosed in Patent document 2, in which there is used a sealing stopper, of an elastomeric substance, having a normally-closed valve structure. The temporary sealing structures disclosed in Patent documents 3 and 4 are complex.

In the light of the above, it is an object of the present invention to provide a sealed type cell manufacturing method that allows efficiently performing temporary sealing of a cell assembly, and performing gas discharge after initial charging, by way of a simple structure, with superior pressure resistance in the temporarily sealed state (pressure-resistance sealability).

The present invention provides a method for manufacturing a sealed type cell (typically, a secondary cell, for instance a non-aqueous electrolyte secondary cell such as a lithium-ion cell). The method comprises a step of configuring a cell assembly by housing an electrode body having a positive electrode and a negative electrode, and an electrolyte (typically, a liquid electrolyte, i.e. an electrolyte solution), in an external case having a through-hole. The method comprises also a step of temporarily sealing the through-hole by welding (preferable welding methods that can be used include, for instance, heat welding and laser transmission welding) a sealing film directly to a welding base or via a base film that is welded beforehand to this welding base that is formed at an annular portion, of the outer surface of the case, that surrounds an opening end (outer opening end) of the through-hole that leads to the exterior of the case.

The method may further comprise a step of performing initial charging of the cell assembly in a state where the through-hole is temporarily sealed. The method may further comprise, after the initial charging step, a step of discharging out excessive gas in the case by opening a hole in the film, to form thereby a gas discharge passage that communicates the interior and the exterior of the case.

In the above manufacturing method, the through-hole is temporarily sealed through welding of the sealing film, and gas is discharged by opening a hole in the sealing film. Such sealing film welding and hole opening can be accomplished easily, and are amenable to automation. The manufacturing method is therefore preferable in terms of, for instance, productivity and costs.

In a typical aspect of the sealed type cell manufacturing method disclosed herein, at least the annular portion of the case is made of aluminum or of an aluminum alloy, and the welding base is formed through a surface-roughening laser irradiation process through irradiation of a laser beam onto the annular portion (herein there can be used, for instance, a laser beam from an YVO4 laser, a YAG laser, a green laser, a fiber laser or the like). The method disclosed herein, therefore, can be preferably realized according to an aspect that further comprises a step of forming the welding base by subjecting the annular portion to a laser irradiation process. An aluminum oxide layer, having typically a fine branched structure, is formed on the welding base as a result of the above laser irradiation process. The thickness of the aluminum oxide layer ranges preferably from about 100 nm to 500 nm (for instance, from about 200 nm to 300 nm). Through welding of the sealing film, directly or via the base film, to the welding base having been subjected to the above laser irradiation process, an anchor effect is elicited thanks to which sufficient welding strength can be secured between the welding base and the sealing film (when the sealing film is directly welded), or between the welding base and the base film (when the sealing film is welded via the base film). For instance, a temporarily sealed state can be preserved whereby the cell assembly resists increases in internal pressure that accompany initial charging or the like (i.e. the cell exhibits good pressure-resistance sealability). The cell assembly in the temporarily sealed state has therefore good handleability.

As used in the present description, the term "cell" denotes a storage device that can exchange electric energy, and encompasses primary cells and secondary cells. In the present description, the term "secondary cell" encompasses so-called storage cells, for instance lithium-ion cells, metal lithium secondary cells, nickel-hydrogen cells or nickel-cadmium cells, as well as storage elements such as electric double-layer capacitors or the like. The technology disclosed herein is typically used in secondary cells and manufacturing methods thereof. The term "aluminum alloy" denotes an alloy having aluminum as a main component (for instance, a content of aluminum not smaller than 50 wt %). Hereafter, aluminum and aluminum alloys are also collectively referred to as "aluminum material".

In a preferred aspect, the method disclosed herein further comprises a step of final-sealing the through-hole, typically after the gas discharge process, by attaching a preferably metallic final sealing member that covers, from outside the sealing film, the outer opening end of the through-hole. The above aspect differs from conventional techniques in which, for instance, temporary sealing is carried out through insertion of a rubber stopper or the like into the through-hole. The above aspect allows manufacturing a cell without the need for a step of removing (stripping) the sealing film (in other words, the sealing film remains in place). The manufacturing process of the cell can be simplified as a result. The final sealing member is preferably attached, for instance, by welding (preferably, by laser welding, electron beam welding or the like).

In the above laser irradiation process, the sites irradiated by the laser beam (laser irradiation sites) may cover substantially the entire surface area of the annular portion (i.e. the area over which the welding base is formed, namely the area at which the sealing film or the base film is welded) i.e. the entire annular portion may be laser-irradiated all over. Alternatively, the laser-irradiated sites may occupy part of the surface area of the annular portion (preferably, an area of no less than ⅔ of the surface area of the annular portion). Preferably, the laser irradiation sites are (distributedly) disposed over the entirety of the annular portion. The distribution of the above-described irradiation sites may be regular or irregular, but is preferably not excessively concentrated. Preferably, the laser irradiation sites are disposed at a substantially uniform density over the entire annular portion. The surface area proportion occupied by laser irradiation sites within the annular portion can be set, for instance, by adjusting the scanning speed of the laser beam in accordance with the lasing frequency and the size of the laser spot.

In a preferred aspect, of the method disclosed herein further comprises a step of, after the gas discharge step, sealing the through-hole by welding a second sealing film to the top face of the above sealing film. Typically, the through-hole is sealed by plugging, through welding of the second sealing film, the hole (gas discharge hole) that is opened in the sealing film (hereafter "first sealing film") for temporary sealing. The cell assembly in a sealed (re-sealed) state by way of the second sealing film has good handleability. In an aspect where for instance an electrolyte solution is used as the electrolyte, the electrolyte solution in the case can be prevented herein from leaking through the gas discharge hole, even when the cell assembly is tilted or shaken. Also, moisture intrusion can be forestalled to a sufficient degree in practice, even when the assembly is not handled in an environment kept at low humidity. The final sealing member (preferably, made of metal) is attached for instance by welding, so that the final sealing member covers, from outside the second sealing film, the outer opening end of the through-hole, in a state where the cell assembly is sealed by the second sealing film. The through-hole is final-sealed thereby. Attachment of the final sealing member is not limited to a low-humidity environment, and can be preferably carried out, for instance, also in an ordinary humid environment.

As the above sealing film there is preferably used a sealing film having a thermoplastic resin material, at least at the surface portions of the weld sites. A polymer material (resin component) having resistance against other constituent materials of the cell (in particular, the electrolyte) is preferably used as the polymer material that forms the above thermoplastic resin material. For instance, a polyolefin resin such as polyethylene, polypropylene or the like can be preferably used as the polymer material.

A multilayer film in which there are layered two or more resin layers having dissimilar compositions can be preferably used as the sealing film. Such a sealing film can combine several characteristics, and is hence preferable. Herein there can be preferably used, for instance, a multilayer film having a resin layer comprising a resin material (polyolefin resin material or the like), having good weldability, on at least one surface (i.e. the top face and/or bottom face), and a resin layer comprising a resin material relatively stiffer than the above material (for instance, a polyester resin material), on the other surface or in the interior of the multilayer film. A multilayer film having the above buildup affords better weldability and pressure-resistance sealability (property whereby the sealed state is preserved against rises in internal pressure). Preferably, the resin layer that forms the bottom face of the sealing film and the resin layer that forms the top face of the sealing film have a matrix (continuous phase) of the same type of resin composition. A sealing film having the above features exhibits good weldability (stack weldability) upon welding of the top face of one sealing film against the bottom face of another sealing film. This is advantageous, for instance, in embodiments where the second sealing film is stacked on and welded to the top face of the first sealing film.

A suitable specific example of the above multilayer film, for instance, may be multilayer film (typically a three-layer film) in which resin layers (polyolefin layers) comprising a polyolefin resin material (for instance polypropylene) are disposed at the top face and the bottom face, and a polyethylene naphthalate layer is disposed between the polyolefin layers. A multilayer film having the above configuration allows realizing, in particular, good weldability and pressure-resistance sealability. A multilayer film having the above configuration is also appropriately stiff, and hence makes for easier welding and hole-opening operations (i.e. affords good handleability), which is advantageous.

Other preferred examples of the above multilayer film include, for instance, a multilayer film in which a laser absorbing material (for instance, carbon black) is added to one or both (typically one) of the resin layers that make up the top face and the bottom face of the multilayer film. A multilayer film having the above configuration is suitable for welding by laser transmission welding. Therefore, the performance of the sealing film can be best brought out by using a multilayer film having the above configuration, in the case where welding of the sealing film is carried out by the laser transmission welding (in particular, in the case of stack welding). In a preferred multilayer film, for instance, a resin layer having added thereto a laser absorbing material is disposed at the bottom face, and a resin layer containing no laser absorbing material is disposed at the top face (i.e. the laser incidence side during laser transmission welding). Except for the presence or absence of added laser absorbing material, the composition of the resin layer in the bottom face and the resin layer in the top face may be substantially identical (preferably, the resin layers are polyolefin layers, for instance polypropylene layers). A multilayer film having the above configuration is suitable for stack welding by laser transmission welding. The resin layer having no laser absorbing material added thereto is preferably formed out of a resin material having good laser transmissivity. For instance, a multilayer film (typically, a three-layer film) may preferably be used such that a polyolefin layer having a laser absorbing material added thereto is disposed at the bottom face, a polyolefin layer having no laser absorbing material added thereto is disposed at the top face, and a polyethylene naphthalate layer is disposed between the polyolefin layers. Such a multilayer film has good laser weldability (in particular when stack welding is performed by laser transmission welding), and can afford excellent pressure-resistance sealability and handleability. The laser absorbing material that can be used is not particularly limited, and may be one, two or more types of laser absorbing material suitably selected from among, for instance, known pigment-based absorbing materials, dye-based absorbing materials and the like that are employed in the field of laser transmission welding. Carbon powders such as carbon black are an example of a preferably used laser absorbing material.

In terms of laser transmission weldability, the laser transmittance of the entire sealing film in the thickness direction ranges preferably from about 70 to 95%. An excessively high laser transmittance (laser transmissivity) results in lower absorption efficiency (utilization efficiency) of the laser beam. An excessively low transmittance hampers stack welding. The above laser transmittance can be adjusted by setting the addition amount of laser absorbing material in accordance with the thickness and characteristics (laser transmissivity and so forth) of each resin layer. Preferably, there can be used for instance a three-layer film comprising polyolefin layers disposed over and under a polyethylene naphthalate layer, wherein the thickness of the polyethylene naphthalate layer is not smaller than 5 µm (typically, from about 5 µm to 200 µm, for instance from about 5 µm to 15 µm), the thickness of each polyolefin layer (the thickness of the top and bottom layers may be identical or dissimilar) is not smaller than 10 µm, (typically, from about 10 µm to 200 µm, for instance from about 30 µm to 50 µm), and the entire thickness of the multilayer film ranges from 25 µm to 250 µm.

In an aspect where both a first sealing film and a second sealing film are used, the above-described preferred sealing film configuration can be used in both sealing films. In an aspect where a base film is used, there can be preferably employed a base film having the same configuration as the above-described preferred sealing film configuration. Although not particularly limited thereto, a preferred aspect may involve using the same material (i.e. a single type of film material) in both the first sealing film and the second sealing film. Such an aspect is advantageous in terms of reducing the number of materials used for manufacturing the cell. For the same reason, a preferred aspect may involve using, in the base film, the same film material as used in the sealing films.

The present invention afford a sealed type cell (for instance, a lithium-ion cell) in which an electrode body provided with a positive electrode and a negative electrode, and an electrolyte are contained in an external case. The external case has a through-hole. A welding base, whose surface has an aluminum oxide layer having a fine branched structure, is formed at an annular portion, of the outer surface of the case, that surrounds an opening end of the through-hole that leads to the exterior of the case. A sealing film is welded to the welding base, directly or via a base film that is welded to the welding base. The sealing film has an opening that faces the through-hole. The through-hole is final-sealed by a final sealing member that is attached so as to cover, from outside the sealing film, the opening end of the through-hole that leads to the exterior of the case. The sealed type cell having the above configuration is a preferred example of a cell that can be manufactured in accordance with any of the methods disclosed herein.

The present invention provides also a sealed type cell (for instance, a lithium-ion cell) that is manufactured in accordance with any of the methods disclosed herein.

Any of the sealed type cells disclosed herein (including sealed type cells manufactured in accordance with any of the methods disclosed herein) can be ideally used as a cell (typically, a secondary cell, for instance a lithium-ion cell) installed in a vehicle. Therefore, the present invention provides a vehicle (for instance, an automobile) that is equipped with a sealed type cell manufactured in accordance with any of the documents disclosed herein.

BEST MODE FOR CARRYING OUT THE INVENTION

Examples of preferred embodiments of the invention are explained below. Any features other than the features specifically set forth in the present description and which may be necessary for carrying out the present invention can be regarded as design matter for a person skilled in the art on the basis of known techniques in the technical field in question. The present invention can be carried out on the basis of the disclosure of the present description and common technical knowledge in the technical field in question.

Figure 14:
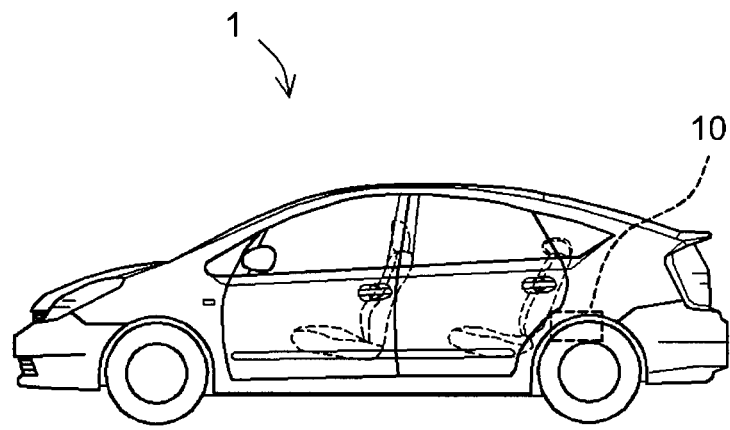
FIG. 14 is a side-view diagram illustrating schematically a vehicle (automobile) provided with a cell manufactured using the method according to the present invention.

The sealed type cell (typically, a secondary cell) manufactured using the method according to the present invention can be suitably used as a power supply for a motor (an electric motor) that is installed in a vehicle, in particular an automobile or the like. Therefore, the present invention provides a vehicle 1 (typically an automobile equipped with a motor, in particular a hybrid automobile, an electric automobile or the like) that is provided with a cell 10 as a power source (the cell may be an assembled cell formed by connecting in series a plurality of cells 10), for instance as illustrated schematically in FIG. 14.

Although not meant in any way to be limited in thereto, a detailed explanation of the present invention follows next on the basis of an example of the manufacture of a sealed type lithium-ion cell in which a wound-type electrode body (wound electrode body) and a nonaqueous liquid electrolyte (electrolyte solution) are contained in a square (box-like) container. In the drawings, elements and portions that elicit the same effect are denoted with the same reference numerals, and a recurrent explanation thereof is omitted.

Example 1

Figure 1:
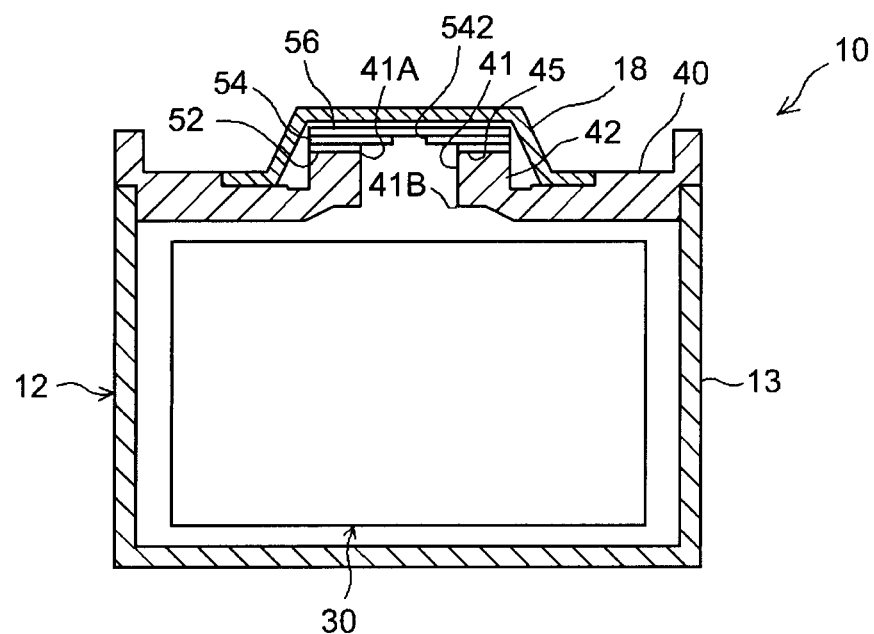
FIG. 1 is a cross-sectional diagram illustrating schematically the structure of a cell according to an embodiment.

As illustrated for instance in FIG. 1, the lithium-ion cell according to the present example comprises an electrode body (wound electrode body) 30 in which an elongate sheet-like positive electrode and negative electrode are wound together in a flat manner, with an elongate-sheet separator interposed in between; and an external case 12 (in the present example, a flat box-like case) shaped so as to house the wound electrode body 30.

Figure 7:
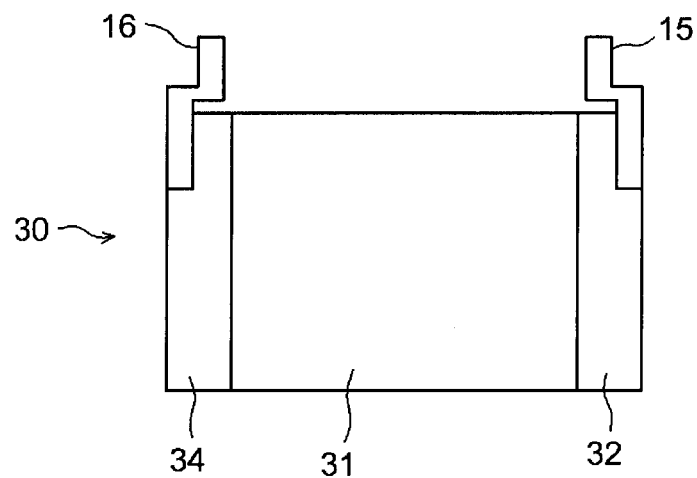
FIG. 7 is a schematic cross-sectional diagram illustrating an example of the structure of a wound electrode body.

As illustrated in FIG. 7, the wound electrode body 30 can be manufactured in the same way as the wound electrode body in ordinary lithium-ion cells, by stacking an elongate sheet-like positive electrode (positive electrode sheet) 32 and a negative electrode (negative electrode sheet) 34, together with two elongate sheet-like separators (separator sheets, not shown), and winding the resulting stack in the longitudinal direction, after which the wound body is squashed flat from the side-face direction. In the present example, the positive electrode sheet 32 and the negative electrode sheet 34 are stacked slightly offset from each other in the width direction, in such a manner that one end of each sheet 32, 34 juts out, in the width direction, beyond a respective end of the separator sheet in the width direction. The stack is then wound together in this state. As a result, the two end portions of the wound electrode body 30 in the winding axis direction have formed thereon, respectively, a portion in which one end of the positive electrode sheet 32 in the width direction juts out beyond a wound core portion 31 (specifically, a portion at which the positive electrode sheet 32, the negative electrode sheet 34 and the separator sheets are tightly wound), and a portion in which one end of the negative electrode sheet 34 in the width direction juts out beyond the wound core portion 31. One end each of a positive electrode terminal 15 and a negative electrode terminal 16 for external connection are connected to respective jutting portions. The electrode terminals 15, 16 are mounted to the external case 12 (lid member 40 described below), and are led out of the case 12 towards the exterior. The electrode terminals 15, 16 have been omitted in FIG. 1 and FIG. 8 described below.

The materials and members that make up the wound electrode body 30 are not particularly limited, and may be the same as those of electrode bodies provided in conventional lithium-ion cells. For instance, the positive electrode sheet 32 may comprise a positive electrode active material layer formed on an elongate positive electrode collector (for instance, aluminum foil). The positive electrode active material used for forming the positive electrode active material layer is not particularly limited, and may be one, two or more types of substances used in conventional lithium-ion cells. Suitable examples thereof include, for instance, lithium transition metal oxides such as $LiNiO_2$, $LiCoO_2$ or $Li_2MnO_4$. The negative electrode sheet 34 may comprise a negative electrode active material layer formed on an elongate negative electrode collector (for instance, copper foil). The negative electrode active material used for forming the negative electrode active material layer is not particularly limited, and may be one, two or more types of substances used in conventional lithium-ion cells. Suitable examples thereof include, for instance, carbon materials such as graphite carbon, amorphous carbon or the like, as well as lithium transition metal oxides or lithium transition metal nitrides. Suitable examples of the separator sheet include, for instance, sheets made up of a porous polyolefin resin. In the present example, aluminum foil is used as the positive electrode sheet 32, $LiNiO_2$ is used as the positive electrode active material, copper foil is used as the negative electrode sheet, and natural graphite is used as the negative electrode active material.

The external case 12 that houses the wound electrode body 30 comprises a case body 13 shaped as a box (i.e. a bottomed hollow parallelepiped) having an opening at one end (corresponding to the end at the top side during ordinary use of the cell 10 of the present example), and a lid member 40 mounted at the opening so as to plug up the latter.

The lid member 40 is formed to a square shape that matches the opening shape of the case body 13. A tubular barrel portion 42 is formed in the center of the lid member 40. The inner peripheral wall of the barrel portion 42 delimits a through-hole 41 that runs through the lid member 40 in the thickness direction. The barrel portion 42 (specifically, the through-hole forming portion that delimits the through-hole 41) extends protruding out of the lid member 40 (case 12), as a result of which an outer opening end 41A of the through-hole 41 is formed at a position higher than the peripheral portion of the outer surface of the lid member 40 that encircles the barrel portion 42. The inner surface of the portion of the lid member 40 at which the barrel portion 42 is formed (specifically, the portion surrounding an inner opening end 41B at which the through-hole 41 opens into the lid member 40) bulges outwards. As a result, the inner opening end 41B is also formed at a position higher than that of the peripheral portion.

At least the portion of the external case 12 that makes up the top end of the barrel portion 42 (i.e. an annular portion 44 that surrounds the outer opening end 41A of the through-hole 41) is made of an aluminum material. The material that makes up the other portions of the external case 12 (portion of the lid member 40 other than the annular portion 44, and the case body 13) is not particularly limited, and may be for instance the same material used in lid members of conventional sealed type cells. At the above portions, the external case 12 is preferably made mainly of a lightweight metallic material having good thermal conductivity. Examples of such metallic material include, for instance, aluminum, stainless steel, nickel-plated steel, copper and the like. The external case 12 may also comprise, for instance, the lid member 40, made up mainly of a metallic material, and fixed (by crimping or the like) to the case body 13 that comprises mainly a resin molding. The annular portion 44, the lid member 40 and the case body 13 of the cell 10 of the present example are all formed mainly out of an aluminum material (for instance, aluminum of series 1000 according to JIS alloy numbering).

A welding base 45 having an aluminum oxide layer that comprises a fine branched structure (which may also be a needle-like or fibrous structure) is formed at the top end face of the barrel portion 42 that surrounds the outer opening end 41A of the through-hole 41. In the lithium-ion cell 10 (finished article) embodied as illustrated in FIG. 1, three resin films 52, 54, 56 are overlappingly welded to the welding base 45, sequentially from the bottom up (i.e. from the welding base 45 side). The resin film (base film) 52, which is welded directly to the welding base 45, is shaped as a ring (holed disc) having an outer diameter and an inner diameter substantially identical to those of the welding base 45. The resin film (first sealing film or temporary sealing film) 54 is stacked on and welded to the top face of the film 52 and is shaped as a circle having substantially the same outer diameter as that of the welding base 45. A hole (gas discharge hole) 542 is formed in the vicinity of the center of the resin film 54 (at a portion covering the outer opening end 41A of the through-hole 41). The hole 542 is of a size that allows the hole to function as a gas discharge passage during the below-described manufacturing process of the cell 10. A resin film (second sealing film or re-sealing film) 56 is stacked on and welded to the top face of the film 54, and is shaped as a circle having substantially the same outer diameter as that of the welding base 45. In the present example, no hole functioning as a gas discharge passage is opened in the resin film 56. A metallic final sealing member 18 is fixed, through welding, to the outer surface of the lid member 40, outside the resin films 52, 54, 56, in such a manner that the final sealing member 18 covers the outer opening end 41A of the through-hole 41. The inner space of the through-hole 41 (i.e. the inner space of the case 12) is sealed (preliminary sealing) by the resin film 56, and is further sealed (final sealing) more tightly (greater sealing performance in terms of preventing intrusion of moisture, and durability of that performance) by the final sealing member 18.

Various polymer materials having resistance (typically, acid resistance) to the employed electrolyte solution can be appropriately selected and used as the polymer material (resin component) in the resin material (preferably, a thermoplastic resin material) that forms the resin films 52, 54, 56. Examples of polymer materials that can be preferably used include, for instance, polyolefin resins (also modified polyolefin resins such as acid-modified polypropylene or the like, likewise hereafter) such as polypropylene (PP), polyethylene (PE) or the like; fluororesins such as perfluoroalkoxyalkanes (PFA), polytetrafluoroethylene (PTFE) or the like; as well as polyester resins such as polyethylene terephthalate (PET), polybutylene terephthalate (PBT), polyethylene naphthalate (PEN) or the like. Other polymer materials that can be used include, for instance, PPS (polyphenylene sulfide), PA (polyamide resins), PI (polyimide resins), PAI (polyamide-imide resins), PEEK (polyether ether keton resins), PES (polyether sulfone resins) and the like. The resin film may be a single-layer film formed out of one resin material that comprises one, two or more of the above-mentioned polymer materials, or may be a multilayer film having two or more resin layers formed out of two or more resin materials having dissimilar compositions (for instance in terms of polymer material composition, presence or absence of additives, and addition amount thereof). From the viewpoint of gas barrier properties, there is preferably used a resin film provided with at least one resin layer that is formed out of a resin material that comprises a crystalline polymer as the above-described polymer material. The thickness of the resin film is not particularly limited, and may be appropriately selected in accordance with the purpose and build-up of the film, but preferably there is used a resin film having ordinarily a thickness from about 10 μm to 1000 μm (for instance from 25 μm to 250 μm).

Figure 6:
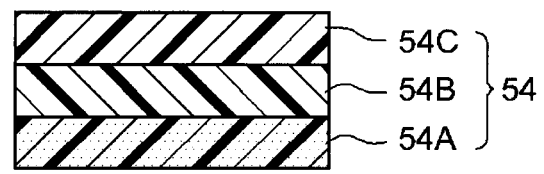
FIG. 6 is a schematic cross-sectional diagram illustrating an example of the structure of a resin film.

In the present example the same film material is used for all the resin films 52, 54, 56. The features of the film material are explained next with reference to the cross-sectional diagram illustrated in FIG. 6, taking the resin film 54 as a representative example. The resin film 54 is configured as a multilayer film having a three-layer structure in which a core layer 54B (12 μm thick) is sandwiched between a lower layer 54A (44 μm thick) and an upper layer 54C (44 μm thick). The core layer 54B is a layer (PEN layer) formed out of a resin material the polymer material of which is PEN. The lower layer 54A and the upper layer 54C are layers (PP layers) formed out of a resin material the polymer material of which is acid-modified PP. The resin material that forms the lower layer 54A has the composition of the resin material that forms the upper layer 54C, but having added thereto carbon black (CB), as a laser absorbing material. The CB content imparts a light gray coloration to the lower layer 54A. The laser transmittance of the resin film 54 as a whole is about 85%. The above thickness values (in brackets) of the resin layers 54A, B, C denote all thickness before welding. Therefore, the thickness of the entire resin film 54 before welding is about 100 μm.

A manufacture example of the lithium-ion cell 10 having the above configuration is explained next with reference to accompanying drawings.

Figure 2:
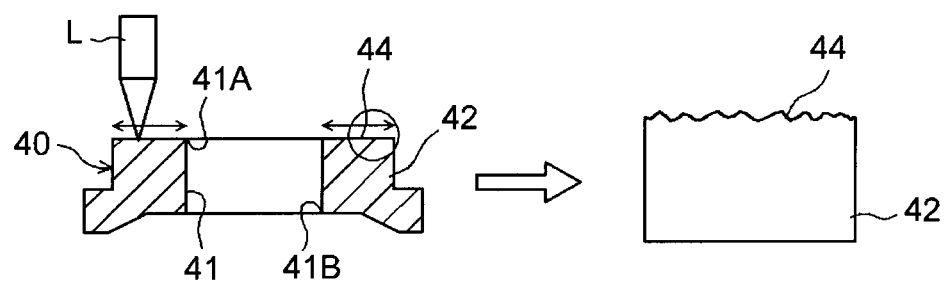
FIG. 2 is a cross-sectional diagram illustrating schematically a manufacturing process of a cell according to an embodiment.
Figure 3:
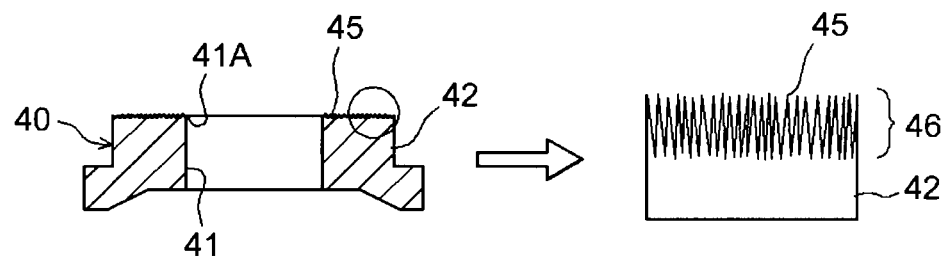
FIG. 3 is a cross-sectional diagram illustrating schematically a manufacturing process of a cell according to an embodiment.

First, the lid member 40 that makes up the external case 12 is prepared. This is followed by a laser irradiation process in which a laser beam L is irradiated onto the annular portion 44 that surrounds the through-hole 41 of the lid member 40, as illustrated schematically in FIG. 2. As a result of this laser irradiation process there is formed an aluminum oxide layer 46 having a fine branched structure, as illustrated in FIG. 3. The welding base 45 is formed then on the top end face (annular portion 44) of the barrel portion 42. The right portion of FIG. 2 illustrates schematically an enlarged view of the surface of the annular portion 44 before the laser irradiation process (i.e. before formation of an aluminum oxide layer 46). The laser irradiation process can be carried out using an ordinary commercially available laser irradiation device, for instance an YVO4 laser having an output of about 5 to 10 W, with a scanning speed of about 10 to 10000 mm/s (preferably, 30 to 5000 mm/s, for instance 100 to 500 mm/s). The conditions of the laser irradiation process are preferably set in such a manner so as to form an aluminum oxide layer 46 having for instance a thickness of about 50 nm to 1000 nm (preferably, about 100 nm to 500 nm, more preferably about 200 nm to 300 nm). If the aluminum oxide layer is much thinner than the above ranges, it may be difficult to achieve the welding strength enhancing effect that is elicited by the laser irradiation process. If the aluminum oxide layer is by contrast much thicker than the above ranges, the aluminum oxide layer is likelier to peel off, and also the energy costs incurred in the laser irradiation process increase significantly.

Figure 4:
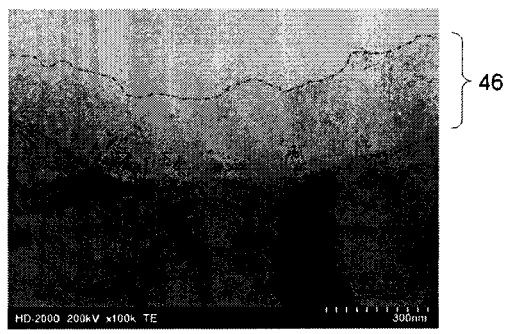
FIG. 4 is SEM micrograph of an aluminum oxide layer formed by a laser irradiation process.

In the present example, laser irradiation was carried out using a YVO4 laser having an output of 6.4 W and a lasing frequency of 15 kHz, at a scanning speed of 100 mm/s. FIG. 4 illustrates a scanning electron micrograph (SEM) image by the SEM at 100,000 magnifications of the area in the vicinity of the top end of the barrel portion 42 after the laser irradiation process. The micrograph showed an aluminum oxide layer (resembling a cloud in the figure) about 250 nm thick, having a fine branched structure, formed on the surface of a portion comprising metallic aluminum (blackish portion at a position roughly below the center of the micrograph).

Figure 5:
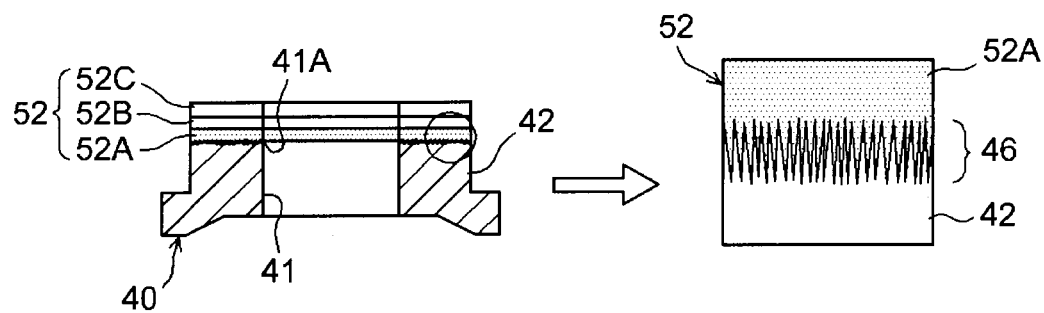
FIG. 5 is a cross-sectional diagram illustrating schematically a manufacturing process of a cell according to an embodiment.

After the above laser irradiation process, the base film 52 having the above-described structure (specifically, a three-layer structure comprising the CB-containing PP layer (lower layer) 52A, the PEN layer (core layer) 52B, and the upper PP layer (upper layer) 52C, are overlaid on the welding base 45, as illustrated in FIG. 5, and the stack is thermally welded through heating and application of pressure. The heat welding process can be performed in the same way as heat welding of an ordinary resin, except that the adhesion surface (herein, the welding base 45) has been subjected to the above-described laser irradiation process. Thermal welding may be carried out, for instance, in such a manner that the maximum attained temperature at the adhesion surface ranges from 150 to 250° C. (preferably from 200 to 250° C.), and the thickness of the film after welding ranges from about 30 to 90% (preferably 50 to 60%) of the thickness before welding. The aluminum oxide layer having a branched structure is formed in this case on the welding base 45, and hence the resin material (in particular, the resin material that in the lower layer 52A) that makes up the base film 52 melts or softens on account of the heat and pressure applied, and seeps into the gaps of the branched structure. The resulting anchor effect allows the welding base 45 (lid member 40) and the base film 52 to become strongly bonded (welded) to each other. The plane shape of the base film 52 has substantially the same annular shape as that of the plane shape of the welding base 45. That is, a hole having substantially the same inner diameter as the inner diameter of the welding base 45 (opening diameter of the outer opening end 41A of the through-hole 41) is formed in the center of the base film 52. The welding base 45 becomes covered entirely by the base film 52 through positioning and welding of the base film 52 onto the welding base 45. The shape of the base film 52 is not limited thereto, and may be a shape such that the base film 52 is welded to the welding base 45 at an annular welding portion surrounding the outer opening end 41A of the through-hole 41, and such that at least the through-hole 41 is not completely plugged up through welding to the base film 52. For instance, the inner-diameter side of the annular base film 52 may jut into the outer opening end 41A.

Figure 8:
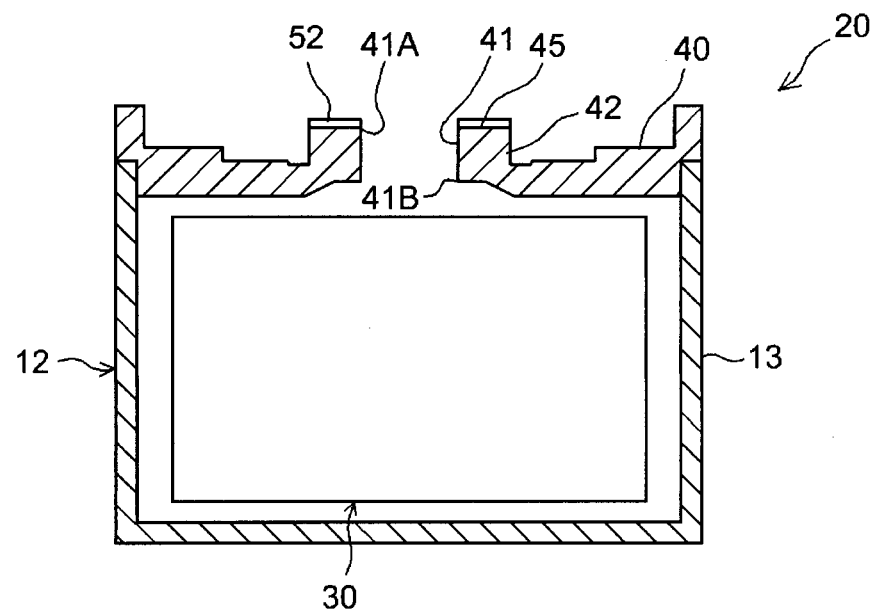
FIG. 8 is a cross-sectional diagram illustrating schematically a manufacturing process of a cell according to an embodiment.

A cell assembly 20 having the configuration illustrated in FIG. 8 can be built, for instance in accordance with the below-described procedure, using the lid member 40 that has been subjected to the above laser irradiation process and base-film welding (herein, heat welding). Specifically, the inner side ends of the positive electrode terminal 15 and the negative electrode terminal 16 fixed beforehand to the lid member 40 are respectively bonded (for instance, welded) to the jutting portions of the positive electrode sheet and negative electrode sheet formed at both ends, in the axial direction, of the wound electrode body 30 having the above configuration, to join thereby the electrode body 30 to the lid member 40. The electrode body 30 joined to the lid member 40 is pushed then in through the opening of the case body 13, and the lid member 40 is placed on the opening. The joint between the lid member 40 and the case body 13 is then sealed for instance through laser welding. The electrode body 30 is housed thereby in the external case 12. At this stage, the through-hole 41 provided in the lid member 40 remains still open (not sealed), as illustrated in FIG. 8. An electrolyte solution (not shown) is then injected into the case 12 through the open through-hole 41, to yield thereby the cell assembly 20 in which the electrode body 30 and the electrolyte solution are held in the external case 12. In the present example, specifically, the cell assembly 20 is built by storing the electrode body 30 in the external case 12, and by injecting then the electrolyte solution into the case 12 via the through-hole 41. Since the electrolyte solution is injected through the through-hole 41 that doubles also as a below-described gas discharge passage, the above embodiment allows reducing the sealing sites in the external case 12, as compared with an embodiment in which electrolyte solution is injected through an electrolyte solution inlet provided separately from the through-hole 41. This elicits at least one effect from among, for instance, enhanced sealability (hermeticity) of the cell, and greater productivity.

The electrolyte solution is not particularly limited, and may be identical to non-aqueous electrolyte solutions that are conventionally used in lithium-ion cells. The non-aqueous electrolyte solution has typically a composition in which an appropriate non-aqueous solvent contains a supporting salt. As the non-aqueous solvent there may be used, for instance, one, two or more solvents selected from the group consisting of ethylene carbonate (EC), propylene carbonate, dimethyl carbonate, diethyl carbonate (DEC), ethylmethyl carbonate, 1,2-dimethoxyethane, 1,2 diethoxyethane, tetrahydrofuran and 1,3-dioxolane. As the supporting salt there can be used, preferably, a lithium salt such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$ or the like. The electrolyte solution used in the present example contains a mixed solvent of EC and DEC (for instance, at a 1:1 weight ratio) containing lithium hexafluorophosphate ($LiPF_6$) at a concentration of about 1 mol/L.

Figure 9:
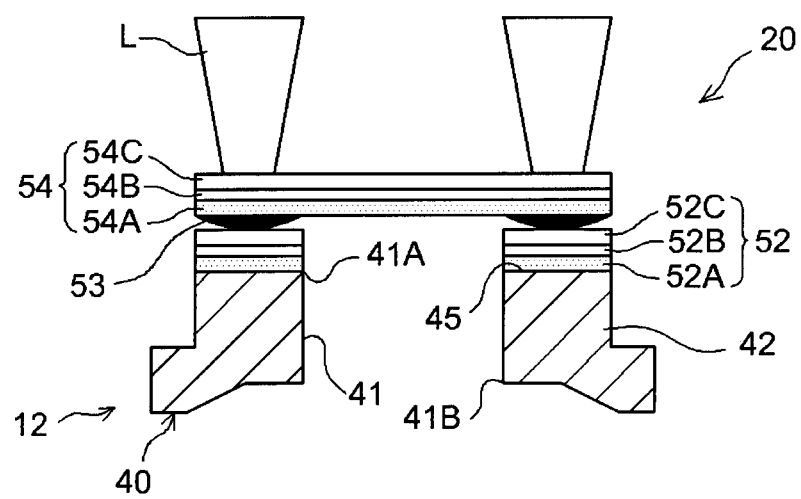
FIG. 9 is a cross-sectional diagram illustrating schematically a manufacturing process of a cell according to an embodiment.

Once the electrolyte solution is injected, the first sealing film 54, having a three-layer structure of CB-containing PP/PEN/PP is welded to the top face of the base film 52 as shown in FIG. 9. The through-hole 41 becomes temporarily sealed thereby. Laser transmission welding is preferably used as the method for welding the first sealing film 54. More specifically, a laser beam L is irradiated from the rear face side of the first sealing film 54 (i.e. the upper layer 54C side), whereupon the lower layer 54A, which comprises a laser absorbing material (CB in this case) is heated through absorption of the laser beam. As a result, a melt pool 53 forms between the lower layer 54A (layer that constitutes the surface to be welded) of the first sealing film 54 and the upper layer 52C of the base film 52. The two films 52, 54 can be welded together as a result.

The method employed for laser transmission welding of the above sealing film may be, for instance, identical to ordinary laser transmission welding of resin films, using known procedures and equipment. The laser irradiation conditions (for instance, laser beam output (W) and scanning speed (mm/s)) can be then appropriately set in such a manner so as to obtain an amount of heat appropriate for welding, in accordance with the features (for instance, resin composition, addition amount of laser absorbing material) of the first sealing film 54 (in particular, the lower layer 54A) and of the base film 52 (in particular, the upper layer 52C).

Thus, the base film (resin film) 52 is joined (for instance welded, herein heat-welded) beforehand to the welding base 45 that surrounds the outer opening end 41A of the through-hole 41, and the first sealing film 54 is welded (herein, by laser transmission welding) to the base film 52. Thereby, the outer opening end 41A can be temporarily sealed in a suitable manner by the first sealing film 54. For instance, the base film 52 is solidly welded to the welding base 45 thanks to the above-described anchor effect. Also, welding between resin materials results ordinarily in a higher welding strength than welding to an inorganic material. Therefore, a good sealing performance (for instance, pressure-resistance sealability) can be realized through welding the first sealing film 54 to the welding base 45 by way of the base film 52. Heat can be effectively generated in the surface to be welded, while avoiding unnecessary heating of other portions, by using thus the first sealing film 54 having a three-layer structure and in which a resin layer (lower layer 54A), containing a laser absorbing material, is disposed on the base film 52 side, and by employing laser transmission welding as the method for welding the first sealing film 54. The melt pool 53 can be appropriately formed as a result while avoiding thermal degradation of the resin films 52, 54. A good welding state can be stably realized thereby. The above-described laser transmission welding is more amenable to automation than, for instance, an operation that involves inserting a rubber plug into the through-hole. The above procedure is therefore advantageous also in terms of raising productivity.

Initial charging of the cell assembly 20 in the above-described temporarily sealed state is performed next. Initial charging can be carried out following the same operation as in conditioning (initial charging and discharging) of conventional ordinary lithium-ion cells. Typically, initial charging is preferably carried out at a charging rate (current value) of ⅓ C or less (typically, ½0 C to ⅓ C) over a lapse of time that extends from charging start up to at least SOC20%. The inner pressure in the case 12 may rise (for instance, to about 0.1 MPa) as a result of initial charging (FIG. 10).

Figure 11:
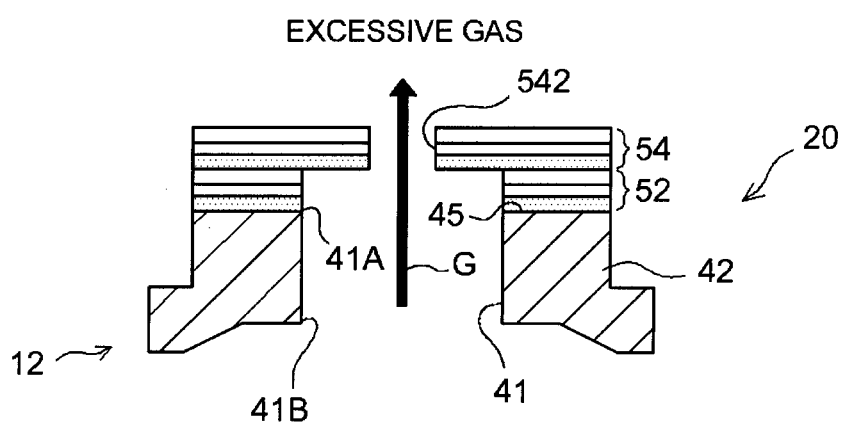
FIG. 11 is a cross-sectional diagram illustrating schematically a manufacturing process of a cell according to an embodiment.

Once initial charging is thus carried out, a gas discharge hole (opening) 542 is formed in the first sealing film 54, as illustrated in FIG. 11. As a result there is formed a gas discharge passage G that leads from the interior of the case 12, via the through-hole 41 and the gas discharge hole 542, out of the case, such that excessive gas inside the external case 12 (typically, gas generated mainly upon the above-described initial charging) is discharged out of the external case 12 via the gas discharge passage G.

Figure 10:
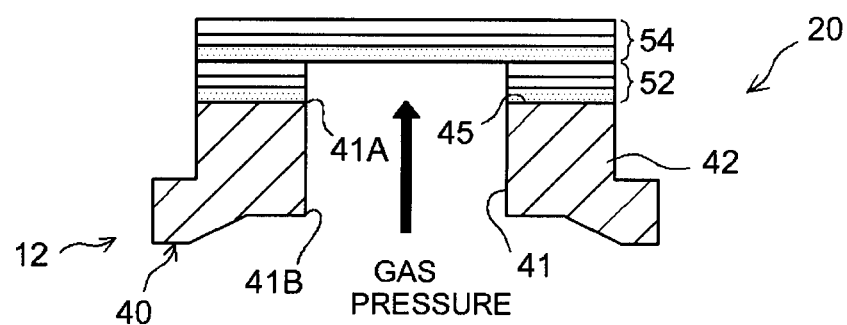
FIG. 10 is a cross-sectional diagram illustrating schematically a manufacturing process of a cell according to an embodiment.

In the temporarily sealed state illustrated in FIG. 10 of the manufacturing method according to the present example, the first sealing film 54 does not get into the through-hole 41. Specifically, the inner space of the through-hole 41 remains empty (in a state where electrolyte solution does not accumulate readily). As described above, the inner opening end 41B of the through-hole 41 is formed at a position higher than the portion surrounding the inner opening end 41B. This is also effective for making the electrolyte solution unlikelier to accumulate in the through-hole 41. The position at which the first sealing film 54 faces into the case 12 via the through-hole 41 (position covering the outer opening end 41A) is a position higher than the surrounding portion (i.e. a position further removed from the liquid surface of the electrolyte solution stored in the case 12). Therefore, the electrolyte solution in the case 12 is unlikelier to reach the inner face of a temporary sealing member. In the above structure, therefore, the electrolyte solution does not accumulate readily in the vicinity of the through-hole 41 and the first sealing film 54. This allows preventing, to a significant degree, the occurrence of gushing of electrolyte solution that accompanies gas discharge, as illustrated in FIG. 11. Blowholes or the like caused by the supporting salt in the electrolyte solution can be prevented as a result from occurring during welding of the final sealing member 18. A good welded article can be realized stably thereby.

The method for forming the gas discharge hole 542 is not particularly limited, and may be a method that allows forming, in the first sealing film 54, a hole that can open the inner space of the through-hole 41 to the exterior. For instance, a hole may be opened at the portion where the first sealing film 54 faces the through-hole 41, using an appropriate punching tool (needle, punch, drill or the like), or may be opened through irradiation of a high-energy beam, such as a laser beam, onto the first sealing film 54. The area over which the hole is opened in the first sealing film 54 may be part of the area (typically, the center) of the portion at which the film 54 faces the through-hole 41, as illustrated in FIG. 11, or an area substantially matching the entire area of that portion. In addition to the above partial or whole portion, the hole may be opened over an area that includes the periphery of the outer opening end 41A (for instance, a circular area having a slightly larger diameter than that of the outer opening end 41A).

Figure 12:
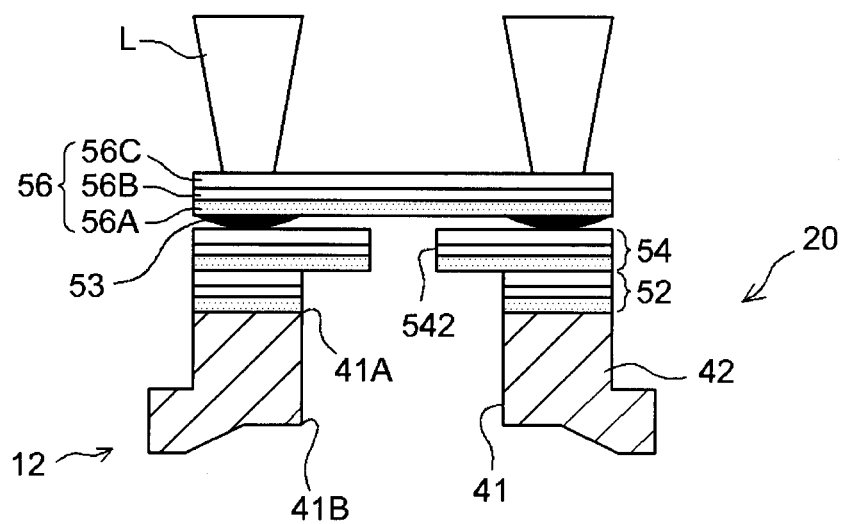
FIG. 12 is a cross-sectional diagram illustrating schematically a manufacturing process of a cell according to an embodiment.

Once gas discharge is over, the second sealing film 56 having the above-described structure (i.e. three-layer structure of the CB-containing PP layer (lower layer) 56A, the PEN layer (core layer) 56B, and the PP layer (upper layer) 56C) is welded to the top face of the first sealing film 54 (typically, through welding of both films 54, 56 at the annular welding portion that surrounds the gas discharge hole 542 provided in the first sealing film 54), to re-seal thereby the through-hole 41 (preliminary sealing), as illustrated in FIG. 12. Laser transmission welding is preferably used as the method for welding the second sealing film 56. More specifically, the films film 54, 56 can be appropriately welded together through irradiation of a laser beam L through the rear face side (i.e., the upper layer 56C side) of the second sealing film 56, as in the case in the operation for welding the first sealing film 54 to the top face of the base film 52.

The metallic final sealing member 18 is then welded to the lid member 40. The final sealing member 18 used herein has a cover portion 18A shaped substantially as a bottomed truncated cone that covers (houses) the barrel portion 42 and the entirety of the resin films 52, 54, 56 that are welded to the top face of the barrel portion 42, and a flange portion 18B that flares in the outer periphery of the opening end of the cover portion 18A. As the constituent material of the final sealing member 18 there can be used, preferably, various metallic materials (aluminum, stainless steel or the like) that can be welded to the lid member 40. An aluminum final sealing member 18 is used in the present example. The through-hole 41 (case 12) is final-sealed through welding (preferably, for instance, by laser welding, electron beam welding or the like) of the flange portion 18B to the lid member 40 at the annular welding portion that surrounds the barrel portion 42. The lithium-ion cell 10 according to the present example can be manufactured as described above. The lithium-ion cell 10 can be subjected thereafter, as the case may require, to an inspection process involving quality checks on cell performance and so forth.

Through welding of a new resin film overlapping the top face of a resin film, the manufacturing method according to the present example facilitates sealing and unsealing of the through-hole 41, repeatedly if necessary. The final sealing member is attached from above the resin films, without the resin films being stripped off the external case 12 (lid member 40), i.e. the resin films may be left to stand. This simplifies advantageously the manufacturing process of the cell.

Example 2

The below-described evaluation test (electrolyte solution vapor exposure test) was carried out in order to assess the influence of the laser irradiation process on the welding strength of the resin films.

Specifically, Al plates (untreated Al plates) 0.8 mm thick, 13.5 mm wide and 110 mm long were prepared. A through-hole having a diameter of 1.6 mm was opened in the Al plates, such that the center of the through-hole stood substantially at the center of the plate, in the width direction, and at about 70 mm from one end of the plate, in the longitudinal direction. A laser irradiation process was carried out, under the conditions set out below, over an area having a diameter of 4.4 mm centered around the through-hole. As a result there were prepared Al plates for film welding according to samples 1 to 10. The surface area actually irradiated by the laser spot was of about ⅔ of the area scanned by the laser, at a scanning speed of 3000 mm/s.

Laser Irradiation Process Conditions
Laser type: YVO4 laser, output: 6.4 W, frequency: 15 kHz, scanning speed: as per Table 1.

Film pieces for welding were prepared by blanking the resin film according to Example 1 (three-layer film stacking from the bottom up, a CB-containing PP layer (thickness 44 μm), a PEN layer (thickness 12 μm) and a PP layer (thickness 44 μm)) into 5 mm-diameter circles. A film piece was disposed on the laser irradiation-processed surface of each Al plate for welding, manufactured as described above, in such a manner that the center of the film piece matched roughly the center of the through-hole. The whole was then placed on a hot plate at 380° C., and was pressed from above the film piece (pressure: 0.04 MPa). The film pieces were heat-welded, through heating and application of pressure, to respective Al plates according to samples 1 to 10. Heating and pressing lasted for 5 seconds. The temperature attained on the top face (the side on which the film pieces is welded) of the Al plates after 5 seconds was about 230° C. The thickness of the resin film after heat-welding (welded thickness) was about 55 μm.

For comparison purposes there were used Al plates having been subjected to surface treatments different from the laser irradiation process, namely an untreated Al plate immersed for 30 minutes in a 15% aqueous solution of sodium hydroxide (sample 11), an untreated Al plate polished with a water-resistant paper #180 (sample 12), an untreated Al plate polished with a water-resistant paper #1000 (sample 13), an untreated Al plate immersed for 30 minutes in acetone (sample 14), and an untreated Al plate having been irradiated with atmospheric-pressure $N_2$ plasma using an atmospheric-pressure plasma surface treatment apparatus (Sekisui Chemical Co., Ltd.) (sample 15). Film pieces for welding prepared in the same way as samples 1 to 10 were heat-welded to the Al plates of samples 11 to 15 and an untreated Al plate (sample 16).

Figure 13:
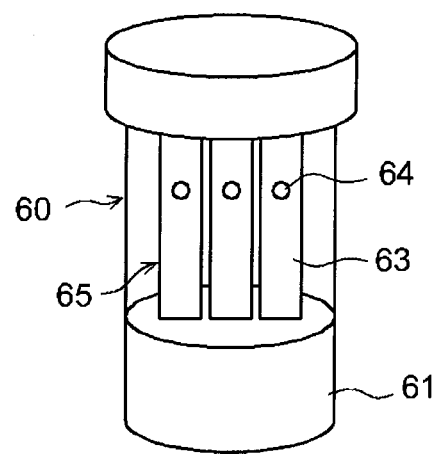
FIG. 13 is an explanatory diagram illustrating schematically a testing method for electrolyte solution exposure.

Next, 40 mL of an electrolyte solution 61, containing $LiPF_6$ at a concentration of about 1 mol/L in a mixed solvent of EC and DMC (weight ratio 1:1), was injected into a tubular container 60 (diameter 3.7 cm, height 8.7 cm) made of polypropylene resin, as illustrated in FIG. 13. Test pieces 65 resulting from heat-welding film pieces 64 to Al plates 63 according to samples 1 to 16 (hereafter, test pieces according to samples 1 to 16 associated to the type of Al plate used) were disposed standing in the container 60, with the lower end of the test piece immersed in the electrolyte solution 61. The container 60 was sealed and was held at 60° C. for 20 hours, to expose thereby the test piece 65 in the container 60 to electrolyte solution vapor.

Figure 15:
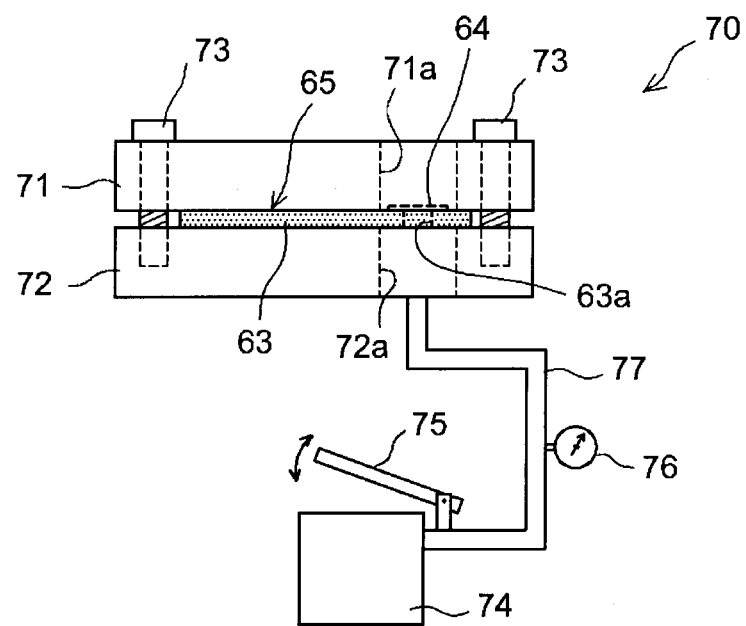
FIG. 15 is an explanatory diagram illustrating schematically a welding strength measuring method.

The test piece 65 was taken out of the container 60, and the welding strength of the test piece after exposure to electrolyte solution vapor was measured using the hydraulic-type pressure resistance measurement device 70 illustrated in FIG. 15. Specifically, the test piece 65 was disposed between a top plate 71 and a bottom plate 72 that made up the measurement device 70, and was secured through fastening by means of a bolt 73. Through-holes 71a, 72a of a size that can accommodate the film piece 64 are respectively provided, at substantially opposite positions, on the top plate 71 and the bottom plate 72. The test piece 65 was disposed in such a manner that the film piece 64 welded to the Al plate 63 was contained in the through-hole 71a of the top plate 71, and in such a manner that a through-hole 63a provided in the Al plate 63 opened to the through-hole 72a of the bottom plate 72 (the opening on the side of the top plate 71 is sealed through welding of the film piece 64). Oil from an oil tank 74 was fed into an oil passage 77 using a manual hydraulic pump 75, so that the load (peel-off load) resulting from the oil pressure was applied to the rear face of the film piece 64, via the through-hole 72a and the through-hole 63a of the Al plate 63 connected to the oil passage 77. The oil pressure at which the sealing of the through-hole 63a broke down was read off an oil pressure gauge 76, and the reading was taken as the measurement value of welding strength.

The obtained results are given in Table 1. The "(0)" value in the welding strength column indicates that the film piece peeled away before start of the welding strength measurement (before application of peel-off load).

TABLE 1

| | Surface treatment method | Scanning speed [mm/S] | Welding strength [MPa] |
| --- | --- | --- | --- |
| Sample 1 | Laser irradiation | 50 | 2.9 |
| Sample 2 | " | 80 | 2.9 |
| Sample 3 | " | 100 | 3.6 |
| Sample 4 | " | 300 | 3.6 |
| Sample 5 | " | 500 | 3.5 |
| Sample 6 | " | 1000 | 2.8 |
| Sample 7 | " | 1300 | 2.6 |
| Sample 8 | " | 1500 | 3.2 |
| Sample 9 | " | 2000 | 3.1 |
| Sample 10 | " | 3000 | 2.6 |
| Sample 11 | Etching | — | (0) |
| Sample 12 | Paper polish (#180) | — | (0) |
| Sample 13 | Paper polish (1000) | — | (0) |
| Sample 14 | Acetone washing | — | (0) |
| Sample 15 | Plasma irradiation | — | (0) |
| Sample 16 | (Not treated) | — | (0) |

As Table 1 shows, the test pieces of samples 1 to 15, in which the surface to be welded had undergone a laser irradiation process, preserved a welding strength of 2 MPa or higher (typically 2 MPa to 5 MPa), and of 2.5 MPa or higher (typically 2.5 MPa to 4 MPa) even after exposure to electrolyte solution vapor under the above-described conditions, irrespective of the laser scanning speed (50 to 3000 mm/s). These results suggest that sealing of the cell assembly through welding of a resin film to the welding base, having been subjected to the above-described laser irradiation process, allows realizing pressure-resistance sealability to a degree such that the rise in pressure on account of, for instance, initial charging (typically, of about 1 MPa) can be resisted with margin to spare (for instance, to a degree such that the sealed state can be preserved even if the cell assembly after initial charging were exposed to an environment at 60° C. for 20 hours). Particularly good results (welding strength of 3.5 MPa or higher) were obtained in the test pieces of samples 3 to 5, where the scanning speed ranged from 100 to 500 mm/s.

By contrast, the welding strength of the test pieces of samples 11 to 16 after exposure to the electrolyte solution vapor under the above-described conditions was insufficient. This suggests that process constraints during initial charging and subsequent gas discharge are greater in a case where the cell assembly is sealed through welding of a resin film to a welding base that has been subjected, for instance, to a surface treatment identical to that of the test pieces of samples 11 to 16 (or that has been subjected to no treatment).

Example 3

An Al plate (sample 17) was prepared through a laser irradiation process under the same conditions as in sample 3 of Example 2. Also, Al plates were prepared by subjecting an Al plate to a laser irradiation process under the above conditions, followed by argon sputtering onto the laser-treated surface, using an X-ray photoelectron spectroscopy (XPS) apparatus during 0.1 seconds (sample 18) or 1 minute (sample 19). The surface of the Al plate of sample 17 has formed thereon an aluminum oxide layer about 250 nm thick as a result of the above-described laser irradiation process. In the Al plates of samples 18, 19, the formed aluminum oxide layer is eroded by argon sputtering, from the top end of the oxide layer. The thickness of the aluminum oxide layer of the Al plate of sample 18 is of about 230 to 240 nm, while the thickness of the aluminum oxide layer of the Al plate of sample 19 is smaller than about 100 nm.

Film pieces identical to those of Example 2 were heat-welded to the Al plates, to prepare thereby test pieces of samples 17 to 19. These test pieces were exposed to electrolyte solution vapor in the same way as in Example 2, and the welding strength after exposure was measured. The results revealed a welding strength of 4.1 MPa, 4.3 MPa and 4.5 MPa (average 4.3 MPa) for the test pieces (n=3) of sample 17; a welding strength of 4.4 MPa and 3.9 MPa (average about 4.2 MPa) for the test pieces (n=2) of sample 18; and a welding strength of 1.8 MPa and 1.9 MPa (average about 1.9 MPa) for the test pieces (n=2) of sample 19. These results indicate that the aluminum oxide layer formed on the welding base contributes significantly to enhancing welding strength (and by extension pressure-resistance sealability). The results indicate also that a welding strength of 2 MPa or higher can be maintained, also after exposure to electrolyte solution vapor, through formation of an aluminum oxide layer having a thickness of 100 nm or greater on the surface to be welded, under the conditions of the example.

Preferred embodiments of the present invention have been explained above, but the embodiments are not limited to the features disclosed herein, and needless to say, can accommodate various modifications.

In a further process in the above-described Example 1, for instance, the cell assembly 20 may be brought to a re-sealed state through welding of the second sealing film 56, after which there is raised the inner pressure of the cell assembly 20, in that sealed state. A hole is opened thereafter in the second sealing film 56 to relieve the inner pressure (for instance, through discharge of excessive gas in the case). Next, the hole in the second sealing film 56 may be plugged through welding of a new (third) sealing film to the top face of the second sealing film 56 (for instance, by laser transmission welding of the sealing film in the same way as in the case of the first and second sealing films). The final sealing member 18 is attached then whereby the through-hole 41 is final-sealed. An example of a process for raising the inner pressure in the cell assembly 20 above may include, for instance, subjecting the assembly 20 to a high-temperature aging treatment for about 10 to 20 hours in a high-temperature environment (for instance, at 40 to 80° C.). The inner pressure of the cell assembly 20 can be raised, for instance to about 0.05 MPa, by way of the above high-temperature aging treatment. The above high-temperature aging treatment may be performed following the initial charging in the above-described Example 1, after which excessive gas is discharged through formation of the gas discharge hole 542 in the first sealing film 54.

Alternatively, the use of the base film 52 in Example 1 may be omitted, and the first sealing film 54 may be welded (for instance, heat-welded) directly to the welding base 45 after pouring of the electrolyte solution. Likewise, the use of the second sealing film 56 in Example 1 may be omitted, and the final sealing member 18 may be attached without preliminary sealing of the gas discharge hole 542 of the first sealing film 54.

In Example 1, a three-layer film identical to the first sealing film 54 is used as the base film 52, but for instance a single-layer resin film having a composition that may contain a laser absorbing material or not (preferably, a composition not containing a laser absorbing material) can also be used as the base film 52. Herein there is preferably used a resin film (i.e. the polypropylene resin film in the above-described example) that has, as a main component, a resin of the same type as the resin component that makes up the lower layer 54A of the first sealing film 54.

The technology disclosed in the present specification encompasses the following features:

(1) A sealed type cell manufacturing method for manufacturing a sealed type cell in which an electrode body provided with a positive electrode and a negative electrode, and an electrolyte are contained in an external case, the method comprising:

a step of configuring a cell assembly by housing the electrode body and the electrolyte in an external case having a through-hole; a step of temporarily sealing the through-hole by welding a sealing film, directly or via a base film that is welded beforehand to the welding base, to an annular portion, of the outer surface of the case, that surrounds an opening end of the through-hole that leads to the exterior of the case; a step of performing initial charging of the cell assembly in a state where the through-hole is temporarily sealed; and a step of, after the initial charging step, discharging out excessive gas in the case by opening a hole in the film to form thereby a gas discharge passage that communicates the interior and the exterior of the case.

(2) The method according to (1), wherein the through-hole formation portion at which the through-hole is delimited and formed within the external case extends further outwards of the case than a peripheral portion that surrounds the through-hole formation portion.

(3) The method according to (1) or (2), further comprising a step of, after the gas discharge step, sealing the through-hole by welding a second sealing film to the top face of the sealing film.

(4) The method according to any one of (1) to (3), wherein the sealing film is a multilayer film in which there are layered two or more resin layers having dissimilar compositions.

(5) The method according to (4), wherein the sealing film is a multilayer film in which a polyolefin layer is disposed at the top face and the bottom face respectively, and a polyethylene naphthalate layer is disposed between the polyolefin layers.

(6) The method according to (4) or (5), wherein a laser absorbing material is added to at least one from among the resin layer that forms the bottom face and the resin layer that forms the top face of the sealing film, and the laser transmittance of the entire sealing film in the thickness direction ranges from 70 to 95%.

(7) The method according to any one of (1) to (6), wherein the sealing film is welded by laser transmission welding.

(8) A sealed type cell, manufactured using the method according to any one of (1) to (7).

(9) A sealed type cell in which an electrode body provided with a positive electrode and a negative electrode, and an electrolyte are contained in an external case, wherein the external case has a through-hole; a sealing film, having an opening that faces the through-hole, is welded, directly or via a base film that is welded to the welding base, to an annular portion, of the outer surface of the case, that surrounds an opening end of the through-hole that leads to the exterior of the case; and the through-hole is final-sealed by a final sealing member that is attached so as to cover, from outside the sealing film, the opening end of the through-hole that leads to the exterior of the case.

The invention claimed is:

1. A sealed type cell manufacturing method for manufacturing a sealed type cell in which an electrode body provided with a positive electrode and a negative electrode, and an electrolyte are contained in an external case, the method comprising:
a step of configuring a cell assembly by housing said electrode body and said electrolyte in an external case having a through-hole;
a step of temporarily sealing said through-hole by welding a sealing film directly to a welding base or via a base film that is welded beforehand to the welding base;
a step of performing initial charging of said cell assembly in a state where said through-hole is temporarily sealed; and
a step of, after said initial charging step, discharging out excessive gas in said case by opening a hole in said film to form thereby a gas discharge passage that communicates with the interior and the exterior of said case;
wherein the welding base is formed through a surface-roughening laser irradiation process in which a laser beam is irradiated onto an annular portion, of the outer surface of the case, that surrounds an opening end of the through-hole that leads to the exterior of said case to roughen the surface of the annular portion,
the annular portion is made of aluminum or of an aluminum alloy, and
either the surface-roughening laser irradiation process is performed prior to the welding of the sealing film directly to the welding base, or the surface-roughening laser irradiation process is performed prior to the welding of the base film to the welding base.

2. The method according to claim 1 further comprising;
a step of forming the welding base by performing the surface-roughening laser irradiation process either prior to the welding of the sealing film directly to the welding base or prior to the welding of the base film to the welding base.

3. The method according to claim 1, wherein the sealing film is a resin film having a thermoplastic resin material at the surface portion of the weld site.

4. The method according to claim 1, wherein an aluminum oxide layer having a fine branched structure is formed on said welding base by said laser irradiation process.

5. The method according to claim 4, wherein a thickness of said aluminum oxide layer ranges from 100 nm to 500 nm.

6. The method according to claim 4, wherein, in the temporarily sealing step, the sealing film is welded via the base film that is welded beforehand to the welding base,
the welding of the base film to the welding base is performed by overlaying the base film on the aluminum oxide layer and then thermally welding through heating and application of pressure.

7. The method according to claim 1, wherein the surface-roughening laser irradiation process is performed by irradiating the laser beam having an output of 5 to 10 W, with a scanning speed of 30 to 5000 mm/s.

8. The method according to claim 1, wherein the surface-roughening laser irradiation process is performed with the through-hole remains open.

9. The method according to claim 1 further comprising:
a step of injecting the electrolyte into the case via the through-hole.

10. The method according to claim 1, further comprising a step of, after said gas discharge step, sealing said through-hole by welding a second sealing film to the top face of said sealing film.

11. The method according to claim 1, wherein said sealing film is a multilayer film in which there are layered two or more resin layers having dissimilar compositions.

12. The method according to claim 11, wherein said sealing film is a multilayer film in which a polyolefin layer is disposed at the top face and the bottom face respectively, and a polyethylene naphthalate layer is disposed between the polyolefin layers.

13. The method according to claim 11, wherein a laser absorbing material is added to at least one of the resin layer that forms the bottom face and the resin layer that forms the top face of said sealing film, and a laser transmittance of the entire sealing film in the thickness direction ranges from 70 to 95%.

14. The method according to claim 1, wherein said sealing film is welded by laser transmission welding.

15. A sealed type cell, manufactured using the method according to claim 1.

* * * * *